(12) United States Patent
Van Zanten et al.

(10) Patent No.: US 7,833,943 B2
(45) Date of Patent: Nov. 16, 2010

(54) MICROEMULSIFIERS AND METHODS OF MAKING AND USING SAME

(75) Inventors: Ryan Van Zanten, Spring, TX (US); Douglas J. Harrison, Tomball, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 159 days.

(21) Appl. No.: 12/239,442

(22) Filed: Sep. 26, 2008

(65) Prior Publication Data

US 2010/0081587 A1    Apr. 1, 2010

(51) Int. Cl.
C09K 8/524 (2006.01)
C09K 8/536 (2006.01)
E21B 43/28 (2006.01)

(52) U.S. Cl. .................. 507/90; 166/305.1; 507/240; 507/245; 507/257; 507/265; 507/266; 516/53; 516/67; 516/72

(58) Field of Classification Search .............. 507/240, 507/266, 90, 245, 257, 265; 166/305.1; 516/53, 67, 72
See application file for complete search history.

(56) References Cited

U.S. PATENT DOCUMENTS

| | | | |
|---|---|---|---|
| 1,922,154 A | 8/1933 | de Groote | |
| 2,050,392 A | 8/1936 | Starr | |
| 2,059,459 A | 11/1936 | Hund et al. | |
| 2,206,187 A | 7/1940 | Herbsman | |
| 2,238,671 A | 4/1941 | Woodhouse | |
| 2,681,889 A | 6/1954 | Menaul et al. | |
| 2,703,316 A | 3/1955 | Schneider | |
| 2,863,832 A | 12/1958 | Perrine | |
| 2,910,436 A | 10/1959 | Fatt et al. | |
| 3,173,484 A | 3/1965 | Huitt | |
| 3,195,635 A | 7/1965 | Fast | |
| 3,272,650 A | 9/1966 | MacVittie | |
| 3,302,719 A | 2/1967 | Fischer | |
| 3,364,995 A | 1/1968 | Atkins | |
| 3,366,178 A | 1/1968 | Malone | |
| 3,455,390 A | 7/1969 | Gallus | |
| 3,481,404 A | 12/1969 | Gidley | |
| 3,548,945 A | 12/1970 | Gidley | |
| 3,630,285 A | 12/1971 | Claytor, Jr. et al. | |
| 3,784,585 A | 1/1974 | Schmitt et al. | |
| 3,819,525 A | 6/1974 | Hattenbrun | |
| 3,828,854 A | 8/1974 | Templeton et al. | |
| 3,836,465 A | 9/1974 | Rhudy et al. | |
| 3,868,998 A | 3/1975 | Lybarger et al. | |
| 3,912,692 A | 10/1975 | Casey et al. | |
| 3,948,672 A | 4/1976 | Harnsberger | |
| 3,955,993 A | 5/1976 | Curtice et al. | |
| 3,960,736 A | 6/1976 | Free et al. | |
| 3,968,840 A | 7/1976 | Tate | |
| 3,986,355 A | 10/1976 | Klaeger | |
| 3,998,272 A | 12/1976 | Maly | |
| 3,998,744 A | 12/1976 | Arnold et al. | |
| 4,010,071 A | 3/1977 | Colegrove | |
| 4,068,718 A | 1/1978 | Cooke, Jr. et al. | |
| 4,136,739 A | 1/1979 | Salathiel et al. | |
| 4,169,798 A | 10/1979 | DeMartino | |
| 4,172,066 A | 10/1979 | Zweigle et al. | |
| 4,252,421 A | 2/1981 | Foley, Jr. | |
| 4,265,673 A | 5/1981 | Pace et al. | |
| 4,267,887 A | 5/1981 | Watanabe | |
| 4,299,825 A | 11/1981 | Lee | |
| 4,387,769 A | 6/1983 | Erbstoesser et al. | |
| 4,460,052 A | 7/1984 | Gockel | |
| 4,470,915 A | 9/1984 | Conway | |
| 4,498,995 A | 2/1985 | Gockel | |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | |
| 4,632,876 A | 12/1986 | Laird et al. | |
| 4,694,905 A | 9/1987 | Armbruster | |
| 4,713,183 A | 12/1987 | Patel et al. | |
| 4,715,967 A | 12/1987 | Bellis et al. | |

(Continued)

FOREIGN PATENT DOCUMENTS

EP    0278540 A2    8/1988

(Continued)

OTHER PUBLICATIONS

Office Communication (Examiner's Answer) dated Sep. 14, 2009 (10 pages), U.S. Appl. No. 11/622,898, filed Jan. 12, 2007.

(Continued)

*Primary Examiner*—Timothy J. Kugel
(74) *Attorney, Agent, or Firm*—Craig W. Roddy; Conley Rose

(57) ABSTRACT

A method comprising contacting a zwitterionic surfactant, co-surfactant, and water to form a microemulsifier, and contacting the microemulsifier with an oleaginous fluid under low shear conditions to form a microemulsion. A method comprising introducing a first wellbore servicing fluid comprising at least one oleaginous fluid into a wellbore, wherein the first wellbore servicing fluid forms oil-wet solids and/or oil-wet surfaces in the wellbore, and contacting the oil-wet solids and/or oil-wet surfaces in the wellbore with a second wellbore servicing fluid comprising a zwitterionic surfactant, a co-surfactant, and a brine to form a microemulsion.

23 Claims, 3 Drawing Sheets

U.S. PATENT DOCUMENTS

| | | | |
|---|---|---|---|
| 4,716,964 A | 1/1988 | Erbstoesser et al. | |
| 4,767,706 A | 8/1988 | Levesque et al. | |
| 4,772,346 A | 9/1988 | Anderson, Jr. et al. | |
| 4,785,884 A | 11/1988 | Armbruster | |
| 4,793,416 A | 12/1988 | Mitchell | |
| 4,797,262 A | 1/1989 | Dewitz | |
| 4,809,783 A | 3/1989 | Hollenbeck et al. | |
| 4,817,721 A | 4/1989 | Pober | |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawson et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck, III | |
| 5,670,473 A | 9/1997 | Scepanski | |
| 5,678,632 A | 10/1997 | Moses et al. | |
| 5,697,440 A | 12/1997 | Weaver et al. | |
| 5,698,322 A | 12/1997 | Tsai et al. | |
| 5,723,416 A | 3/1998 | Liao | |
| 5,762,138 A | 6/1998 | Ford et al. | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Norman et al. | |
| 5,813,466 A | 9/1998 | Harris et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,888,944 A | 3/1999 | Patel | |
| 5,893,416 A | 4/1999 | Read | |
| 5,905,061 A | 5/1999 | Patel | |
| 5,908,073 A | 6/1999 | Nguyen et al. | |
| 5,909,774 A | 6/1999 | Griffith et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,977,031 A | 11/1999 | Patel | |
| 5,979,557 A | 11/1999 | Card et al. | |
| 5,985,800 A | 11/1999 | Patel | |
| 5,990,050 A | 11/1999 | Patel | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,029,755 A | 2/2000 | Patel | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,218,342 B1 | 4/2001 | Patel | |
| 6,221,920 B1 | 4/2001 | Hillion et al. | |
| 6,242,390 B1 | 6/2001 | Mitchell et al. | |
| 6,258,859 B1 | 7/2001 | Dahayanake et al. | |
| 6,260,622 B1 | 7/2001 | Blok et al. | |
| 6,279,656 B1 | 8/2001 | Sinclair et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson, Sr. et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,401,819 B1 | 6/2002 | Harris et al. | |
| 6,405,809 B2 | 6/2002 | Patel et al. | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,091 B1 | 12/2002 | Weaver et al. | |
| 6,488,763 B2 | 12/2002 | Brothers et al. | |

| | | |
|---|---|---|
| 6,494,263 B2 | 12/2002 | Todd |
| 6,508,305 B1 | 1/2003 | Brannon et al. |
| 6,509,301 B1 | 1/2003 | Vollmer |
| 6,527,051 B1 | 3/2003 | Reddy et al. |
| 6,543,276 B2 | 4/2003 | Murphy, Jr. et al. |
| 6,554,071 B1 | 4/2003 | Reddy et al. |
| 6,566,310 B2 | 5/2003 | Chan |
| 6,569,814 B1 | 5/2003 | Brady et al. |
| 6,578,630 B2 | 6/2003 | Simpson et al. |
| 6,589,917 B2 | 7/2003 | Patel et al. |
| 6,599,863 B1 | 7/2003 | Palmer et al. |
| 6,608,006 B2 | 8/2003 | Taylor et al. |
| 6,620,437 B2 | 9/2003 | Ewbank et al. |
| 6,667,279 B1 | 12/2003 | Hessert et al. |
| 6,669,771 B2 | 12/2003 | Tokiwa et al. |
| 6,681,856 B1 | 1/2004 | Chatterji et al. |
| 6,686,328 B1 | 2/2004 | Binder |
| 6,691,780 B2 | 2/2004 | Nguyen et al. |
| 6,691,805 B2 | 2/2004 | Thaemlitz |
| 6,702,023 B1 | 3/2004 | Harris et al. |
| 6,710,019 B1 | 3/2004 | Sawdon et al. |
| 6,716,797 B2 | 4/2004 | Brookey |
| 6,737,385 B2 | 5/2004 | Todd et al. |
| 6,761,218 B2 | 7/2004 | Nguyen et al. |
| 6,763,888 B1 | 7/2004 | Harris et al. |
| 6,764,981 B1 | 7/2004 | Eoff et al. |
| 6,770,293 B2 | 8/2004 | Angel et al. |
| 6,790,811 B2 | 9/2004 | Patel |
| 6,793,018 B2 | 9/2004 | Dawson et al. |
| 6,793,025 B2 | 9/2004 | Patel et al. |
| 6,793,730 B2 | 9/2004 | Reddy et al. |
| 6,806,233 B2 | 10/2004 | Patel |
| 6,806,235 B1 | 10/2004 | Mueller et al. |
| 6,817,414 B2 | 11/2004 | Lee |
| 6,818,594 B1 | 11/2004 | Freeman et al. |
| 6,828,280 B2 | 12/2004 | England et al. |
| 6,837,309 B2 | 1/2005 | Boney et al. |
| 6,840,318 B2 | 1/2005 | Lee et al. |
| 6,852,173 B2 | 2/2005 | Banerjee et al. |
| 6,861,394 B2 | 3/2005 | Ballard et al. |
| 6,877,563 B2 | 4/2005 | Todd et al. |
| 6,881,709 B2 | 4/2005 | Nelson et al. |
| 6,883,608 B2 | 4/2005 | Parlar et al. |
| 6,886,635 B2 | 5/2005 | Hossaini et al. |
| 6,896,058 B2 | 5/2005 | Munoz, Jr. et al. |
| 6,904,971 B2 | 6/2005 | Brothers et al. |
| 6,908,887 B2 | 6/2005 | Thaemlitz |
| 6,908,888 B2 | 6/2005 | Lee et al. |
| 6,949,491 B2 | 9/2005 | Cooke, Jr. |
| 6,953,090 B2 | 10/2005 | Vijn et al. |
| 6,959,767 B2 | 11/2005 | Horton et al. |
| 6,978,838 B2 | 12/2005 | Parlar et al. |
| 6,981,552 B2 | 1/2006 | Reddy et al. |
| 6,983,798 B2 | 1/2006 | Todd |
| 6,983,801 B2 | 1/2006 | Dawson et al. |
| 6,987,083 B2 | 1/2006 | Phillippi et al. |
| 6,989,354 B2 | 1/2006 | Thaemlitz et al. |
| 6,997,259 B2 | 2/2006 | Nguyen |
| 7,000,701 B2 | 2/2006 | Todd et al. |
| 7,007,752 B2 | 3/2006 | Reddy et al. |
| 7,021,377 B2 | 4/2006 | Todd et al. |
| 7,021,383 B2 | 4/2006 | Todd et al. |
| 7,032,663 B2 | 4/2006 | Nguyen |
| 7,036,585 B2 | 5/2006 | Zhou et al. |
| 7,036,586 B2 | 5/2006 | Roddy et al. |
| 7,036,587 B2 | 5/2006 | Munoz, Jr. et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,052,901 B2 | 5/2006 | Crews |
| 7,063,151 B2 | 6/2006 | Nguyen et al. |
| 7,066,258 B2 | 6/2006 | Justus et al. |
| 7,066,260 B2 | 6/2006 | Sullivan et al. |
| 7,069,994 B2 | 7/2006 | Cooke, Jr. |
| 7,080,688 B2 | 7/2006 | Todd et al. |
| 7,093,658 B2 | 8/2006 | Chatterji et al. |
| 7,093,664 B2 | 8/2006 | Todd et al. |
| 7,096,947 B2 | 8/2006 | Todd et al. |
| 7,098,171 B2 | 8/2006 | Thaemlitz |
| 7,101,829 B2 | 9/2006 | Guichard et al. |
| 7,112,557 B2 | 9/2006 | Thaemlitz |
| 7,125,826 B2 | 10/2006 | Taylor et al. |
| 7,131,491 B2 | 11/2006 | Blauch et al. |
| 7,132,389 B2 | 11/2006 | Lee |
| 7,134,496 B2 | 11/2006 | Jones et al. |
| 7,140,438 B2 | 11/2006 | Frost et al. |
| 7,147,067 B2 | 12/2006 | Getzlaf et al. |
| 7,151,077 B2 | 12/2006 | Prud'homme et al. |
| 7,153,902 B2 | 12/2006 | Altes et al. |
| 7,156,174 B2 | 1/2007 | Roddy et al. |
| 7,159,659 B2 | 1/2007 | Welton et al. |
| 7,165,617 B2 | 1/2007 | Lord et al. |
| 7,166,560 B2 | 1/2007 | Still et al. |
| 7,168,489 B2 | 1/2007 | Frost et al. |
| 7,172,022 B2 | 2/2007 | Reddy et al. |
| 7,178,594 B2 | 2/2007 | Patel |
| 7,178,596 B2 | 2/2007 | Blauch et al. |
| 7,195,068 B2 | 3/2007 | Todd |
| 7,204,311 B2 | 4/2007 | Welton et al. |
| 7,204,312 B2 | 4/2007 | Roddy et al. |
| 7,205,264 B2 | 4/2007 | Boles |
| 7,216,705 B2 | 5/2007 | Saini et al. |
| 7,219,731 B2 | 5/2007 | Sullivan et al. |
| 7,222,672 B2 | 5/2007 | Blauch et al. |
| 7,228,904 B2 | 6/2007 | Todd et al. |
| 7,238,646 B2 | 7/2007 | Thaemlitz et al. |
| 7,256,159 B2 | 8/2007 | Guichard et al. |
| 7,261,156 B2 | 8/2007 | Nguyen et al. |
| 7,264,051 B2 | 9/2007 | Nguyen et al. |
| 7,265,079 B2 | 9/2007 | Willberg et al. |
| 7,267,170 B2 | 9/2007 | Mang et al. |
| 7,267,466 B2 | 9/2007 | Reiss |
| 7,299,869 B2 | 11/2007 | Kalman |
| 7,299,874 B2 | 11/2007 | Welton et al. |
| 7,303,014 B2 | 12/2007 | Reddy et al. |
| 7,303,019 B2 | 12/2007 | Welton et al. |
| 7,306,037 B2 | 12/2007 | Nguyen et al. |
| 7,314,850 B2 | 1/2008 | Taylor et al. |
| 7,322,412 B2 | 1/2008 | Badalamenti et al. |
| 7,353,879 B2 | 4/2008 | Todd et al. |
| 7,380,606 B2 | 6/2008 | Pursley et al. |
| 7,514,390 B2 | 4/2009 | Chan |
| 2001/0016562 A1 | 8/2001 | Muir et al. |
| 2003/0130133 A1 | 7/2003 | Vollmer |
| 2003/0147965 A1 | 8/2003 | Bassett et al. |
| 2003/0230407 A1 | 12/2003 | Vijn et al. |
| 2004/0070093 A1 | 4/2004 | Mathiowitz et al. |
| 2004/0072696 A1 | 4/2004 | Patel |
| 2004/0138068 A1 | 7/2004 | Rimmer et al. |
| 2004/0170836 A1 | 9/2004 | Bond et al. |
| 2004/0176478 A1 | 9/2004 | Dahayanake et al. |
| 2004/0231845 A1 | 11/2004 | Cooke, Jr. |
| 2005/0028976 A1 | 2/2005 | Nguyen |
| 2005/0034861 A1 | 2/2005 | Saini et al. |
| 2005/0059556 A1 | 3/2005 | Munoz et al. |
| 2005/0059557 A1 | 3/2005 | Todd et al. |
| 2005/0130848 A1 | 6/2005 | Todd et al. |
| 2005/0183741 A1 | 8/2005 | Surjaatmadja et al. |
| 2005/0209107 A1 | 9/2005 | Pursley et al. |
| 2005/0257932 A1 | 11/2005 | Davidson et al. |
| 2005/0272613 A1 | 12/2005 | Cooke, Jr. |
| 2005/0277554 A1 | 12/2005 | Blauch et al. |
| 2006/0016596 A1 | 1/2006 | Pauls et al. |
| 2006/0032633 A1 | 2/2006 | Nguyen |
| 2006/0041028 A1 | 2/2006 | Crews |
| 2006/0046938 A1 | 3/2006 | Harris et al. |

| | | | |
|---|---|---|---|
| 2006/0065397 A1 | 3/2006 | Nguyen et al. |
| 2006/0105917 A1 | 5/2006 | Munoz, Jr. |
| 2006/0105918 A1 | 5/2006 | Munoz, Jr. |
| 2006/0108150 A1 | 5/2006 | Luke et al. |
| 2006/0118300 A1 | 6/2006 | Welton et al. |
| 2006/0169182 A1 | 8/2006 | Todd et al. |
| 2006/0169450 A1 | 8/2006 | Mang et al. |
| 2006/0172891 A1 | 8/2006 | Gewehr et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0183646 A1 | 8/2006 | Welton et al. |
| 2006/0185848 A1 | 8/2006 | Surjaatmadja et al. |
| 2006/0229212 A1 | 10/2006 | Willberg et al. |
| 2006/0234873 A1 | 10/2006 | Ballard |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener et al. |
| 2007/0027253 A1 | 2/2007 | Jones et al. |
| 2007/0100029 A1 | 5/2007 | Reddy et al. |
| 2007/0169938 A1 | 7/2007 | Moorehead et al. |
| 2007/0173416 A1 | 7/2007 | Moorehead et al. |
| 2007/0298977 A1 | 12/2007 | Mang et al. |
| 2008/0009423 A1 | 1/2008 | Mang et al. |
| 2008/0076682 A1 | 3/2008 | Jones et al. |
| 2008/0078549 A1 | 4/2008 | Moorehead et al. |
| 2008/0110618 A1 | 5/2008 | Quintero et al. |
| 2008/0169102 A1 | 7/2008 | Carbajal et al. |
| 2008/0169103 A1 | 7/2008 | Carbajal et al. |
| 2008/0287324 A1 | 11/2008 | Pursley et al. |

FOREIGN PATENT DOCUMENTS

| | | | |
|---|---|---|---|
| EP | 0510762 A2 | 10/1992 |
| EP | 0879935 A2 | 11/1998 |
| EP | 1413710 A1 | 4/2004 |
| GB | 2032491 A | 5/1980 |
| GB | 2109034 A | 5/1983 |
| GB | 2116966 A | 10/1983 |
| GB | 2163790 A | 3/1986 |
| GB | 2412389 A | 9/2005 |
| JP | 2004181820 A | 2/2004 |
| WO | 9315127 A1 | 8/1993 |
| WO | 9407949 A1 | 4/1994 |
| WO | 9408078 A1 | 4/1994 |
| WO | 9408090 A1 | 4/1994 |
| WO | 9509879 A1 | 4/1995 |
| WO | 9711845 A1 | 4/1997 |
| WO | 9927229 A1 | 6/1999 |
| WO | 0008112 A1 | 2/2000 |
| WO | 0057022 A1 | 9/2000 |
| WO | 0102698 A1 | 1/2001 |
| WO | 0142387 A1 | 6/2001 |
| WO | 0187797 A1 | 11/2001 |
| WO | 0194744 A1 | 12/2001 |
| WO | 0212674 A1 | 2/2002 |
| WO | 02055843 A1 | 7/2002 |
| WO | 03027431 A2 | 4/2003 |
| WO | 03027431 A3 | 4/2003 |
| WO | 2004007905 A1 | 1/2004 |
| WO | 2004037946 A1 | 5/2004 |
| WO | 2004038176 A1 | 5/2004 |
| WO | 2005095755 A1 | 10/2005 |
| WO | 2006029019 A2 | 3/2006 |
| WO | 2006029019 A3 | 3/2006 |
| WO | 2006093863 A2 | 9/2006 |
| WO | 2006093863 A3 | 9/2006 |
| WO | 2006109016 A1 | 10/2006 |
| WO | 2008038033 A1 | 4/2008 |
| WO | 2008045734 A2 | 4/2008 |
| WO | 2008045734 A3 | 4/2008 |

OTHER PUBLICATIONS

Ng, S. Y., et al., "Development of a poly(ortho ester) prototype with a latent acid in the polymer backbone for 5-fluorouracil delivery," Journal of Controlled Release, 2000, pp. 367-374, vol. 65, Elsevier Science B.V.

Ng, S. Y., et al., "Synthesis and erosion studies of self-catalyzed poly(ortho ester)s," Macromolecules, 1997, pp. 770-772, vol. 30, No. 4, American Chemical Society.

Norman. Lewis R., et al., "Temperature-stable acid-gelling polymers: laboratory evaluation and field results," Nov. 1984, pp. 2011-2018, Journal of Petroleum Technology.

Notice of Allowance dated Sep. 26, 2008 (4 pages), U.S. Appl. No. 11/536,833, filed Sep. 29, 2006.

Office Action dated Jun. 22, 2007 (11 pages), U.S. Appl. No. 11/622,898, filed Jan. 12, 2007.

Office Action (Final) dated Dec. 27, 2007 (10 pages), U.S. Appl. No. 11/622,898, filed Jan. 12, 2007.

Office Action dated Feb. 12, 2008 (8 pages), U.S. Appl. No. 11/536,833, filed Sep. 29, 2006.

Office Action dated Mar. 19, 2008 (13 pages), U.S. Appl. No. 11/622,907, filed Jan. 12, 2007.

Office Action dated May 21, 2008 (21 pages), U.S. Appl. No. 11/622,898, filed Jan. 12, 2007.

Patent application entitled "Compositions and Methods for the Removal of Oil-Based Filtercakes," by Eric Davidson, filed May 13, 2008 as U.S. Appl. No. 12/120,159.

Peterson, Marvin L., et al., "Esterification," An I/EC Unit Processes Review, Sep. 1960, pp. 807-811, vol. 52, No. 9, Industrial and Engineering Chemistry.

Purac America Inc. Material Safety Data Sheet for PURASOLV ML plus Purac product line datasheets, http://hazard.com/msds/f2/cbj/cbjlq.html, Dec. 13, 1991, 6 pages.

Quintero, L., et al., "One-step acid removal of an invert emulsion," SPE 94604, SPE European Formation Damage Conference, Scheveningen, The Netherlands, May 25-27, 2005, pp. 1-9, Society of Petroleum Engineers.

Reid, E. Emmet, "Esterification," Sep. 1953, pp. 1936-1943, vol. 45, No. 9, Industrial and Engineering Chemistry.

Reid, E. Emmet, "Esterification," Sep. 1954, pp. 1801-1808, vol. 46, No. 9, Industrial and Engineering Chemistry.

Rothen-Weinhold, A., et al., "Release of BSA from poly(ortho ester) extruded thin strands," Journal of Controlled Release, 2001, pp. 31-37, vol. 71, Elsevier Science B.V.

Schwach-Abdellaoui, K., et al., "Control of molecular weight for auto-catalyzed poly(ortho ester) obtained by polycondensation reaction," International Journal of Polymer Anal. Charact., 2002, pp. 145-161, vol. 7, Taylor & Francis.

Schwach-Abdellaoui, K., et al., "Hydrolysis and erosion studies on autocatalyzed poly(ortho esters) containing lactoyl-lactyl acid dimers," Macromolecules, 1999, pp. 301-307, vol. 32, No. 2, American Chemical Society.

Simmons, Tara L., et al., "Poly(phenyllactide): synthesis, characterization, and hydrolytic degradation," Biomacromolecules, 2001, pp. 658-663, vol. 2, No. 3, American Chemical Society.

Sinclair, Richard G., "Slow-release pesticide system: polymers of lactic and glycolic acids as ecologically beneficial, cost-effective encapsulating materials," Oct. 1973, pp. 955-956, vol. 7, No. 10, Environmental Science and Technology.

Siskin, Michael, et al., "Aqueous organic chemistry. 1. Aquathermolysis: comparison with thermolysis in the reactivity of aliphatic compounds," Energy & Fuels, 1990, pp. 475-482, vol. 4, No. 5, American Chemical Society.

Skrabal, Anton, "On the kinetics of acid and basic catalysis," Chemical Institute of the University, Gras, 1928, pp. 687-696, Aberdeen: The University Press.

Skrabal, Anton, et al., "The hydrolysis rate of orthoformic acid ethyl ether," Chemical Institute of the University of Graz, Jan. 13, 1921, pp. 1-38 plus 1 cover page, Translated from German by the McElroy Translation Company, Job No. 415-104489.

Special Products Material Safety Data Sheet entitled "GS 22 Series (89A, 89B, 91A, 91B, 92A, 92B, 94A, 94B)," Version 1.0, Nov. 10, 2005, 5 pages, Special Products.

Stefanidis, Dimitrios, "General base catalysis of ester hydrolysis," Jul. 14, 1993, pp. 6045-6050 plus 1 cover page and 1 publication page, vol. 115, No. 14, Journal of the American Chemical Society.

Stepan Product Bulletin entitled "Amphosol® LB," Jan. 2006, 3 pages, Stepan.

SYNPERONIC PE/L64 Safety Data Sheet, Version 3, Nov. 22, 2005, 6 pages, ICI Group of Companies.

Tarkow, Harold, et al., "The reaction of formic acid with carbohydrates. I. The reaction of formic acid with sugars," Feb. 1952, pp. 262-266, vol. 56.

Tarkow, Harold, et al., "The reaction of formic acid with carbohydrates. II. Polysaccharides: A new method for determining accessibility," Feb. 1952, pp. 266-271, vol. 56.

Tood, B., et al., A chemical 'trigger' useful for oilfield applications, SPE 92709, SPE International Symposium on Oilfield Chemistry, Houston, Texas, Feb. 2-4, 2005, pp. 1-7, Society of Petroleum Engineers, Inc.

Todd, Brad, et al., "An innovative system for complete cleanup of a drill-in fluid filter cake," SPE 86494, SPE International Symposium and Exhibition on Formation Damage Control, Lafayette, Louisiana, Feb. 18-20, 2004, pp. 1-9, Society of Petroleum Engineers.

Todd, Brad, et al., "Laboratory device for testing of delayed-breaker solutions on horizontal wellbore filter cakes," SPE 68968, SPE European Formation Damage Conference, The Hague, The Netherlands, May 21-22, 2001, pp. 1-9, Society of Petrolelum Engineers, Inc.

Toncheva, V., et al., "Use of block copolymers of poly(ortho esters) and poly(ethylene glycol) micellar carriers as potential tumour targeting systems," Journal of Drug Targeting, 2003, pp. 345-353, vol. 11, No. 6, Taylor & Francis Ltd.

Vichaibun, Virun, et al., "A new assay for the enzymatic degradation of polylactic acid," 2003, pp. 297-300, vol. 29, ScienceAsia.

Whistler, Roy L., et al., "Distribution of formyl groups in amylose monoformate," Aug. 20, 1959, pp. 4427-4429 plus 1 cover page, vol. 81, The Journal of the American Chemical Society.

Whitfill, Donald L., "Session 5: fluid evaluation and selection for minimal damage," Keynote Paper, SPE European Formation Damage Conference, Amsterdam, May 21-22, 2001, pp. 1-4, Society of Petroleum Engineers, Inc.

Williams, Roger J., et al., "The relation between the hydrolysis equilibrium constant of esters and the strengths of the corresponding acids," May 1928, pp. 1267-1271, vol. 50.

Wolff, I. A., et al., "Starch formate," Jul. 20, 1957, pp. 3860-3862 plus 1 cover page, vol. 79, The Journal of the American Chemical Society.

Woodbridge, R. G., Jr, "Notes on cellulose esters," 1909, pp. 1067-1071 plus 1 cover page, vol. 31, The Journal of the American Chemical Society.

Yin, Mao, et al., "Preparation and characterization of substituted polylactides," Macromolecules, Nov. 16, 1999, pp. 7711-7718, vol. 32, No. 23, American Chemical Society.

Yin, Mao, et al., "Synthesis and properties of polymers derived from substituted lactic acids," 2001, pp. 147-159, American Chemical Society.

Zignani, M., et al., "Subconjunctival biocompatibility of a viscous bioerodable poly(ortho ester)," 1998, pp. 277-285, John Wiley & Sons, Inc.

Bumajdad, Ali, et al., "Properties of mixed alcohol—zwitterionic surfactant films in quaternary water-in-oil microemulsions," Langmuir, 2003, pp. 7219-7225, vol. 19, No. 18, American Chemical Society.

Gotch, Albert J., et al., "Formation of single-phase microemulsions in toluene/water/nonionic surfactant systems," Langmuir, 2008, pp. 4485-4493, vol. 24, No. 9, American Chemical Society.

Gradzielski, M., "Effect of the cosurfactant structure on the bending elasticity in nonionic oil-in-water microemulsions," Langmuir, 1998, pp. 6037-6044, vol. 14, No. 21, American Chemical Society.

Hellweg, Thomas, "Phase structures of microemulsions," Current Opinion in Colloid & Interface Science, 2002, pp. 50-56, vol. 7, Elsevier Science Ltd.

Kumar, Promod, et al., "Handbook of microemulsion science and technology.", Title page only.

Kunieda, Hironobu, et al., "Effect of added salt on the maximum solubilization in an ionic-surfactant microemulsion," Langmuir, 1996, pp. 5796-5799, vol. 12, No. 24, American Chemical Society.

Rosano, Henri L., et al., "Microemulsion systems," 1987, 2 pages, Marcel Dekker, Inc., USA.

Foreign communication from a related counterpart application—International Search Report and Written Opinion, PCT/GB2009/001183, Jul. 15, 2009, 10 pages.

Office Action (Final) dated Nov. 16, 2009 (8 pages), U.S. Appl. No. 11/622,907, filed Jan. 12, 2007.

Office Action dated Dec. 16, 2009 (13 pages), U.S. Appl. No. 12/120,159, filed May 13, 2008.

Office Action (Final) dated Nov. 10, 2008 (13 pages), U.S. Appl. No. 11/622,898, filed Jan. 12, 2007.

Office Action (Final) dated Nov. 13, 2008 (22 pages), U.S. Appl. No. 11/622,907 filed Jan. 12, 2007.

Foreign communication from a related counterpart application—International Search Report and Written Opinion, PCT/GB2009/002156, Feb. 5, 2010, 8 pages.

Ingram, Stephen, et al., "Enhancing and sustaining well production: Granite Wash, Texas Panhandle," SPE 106531, SPE Production and Operations Symposium, Oklahoma City, Oklahoma, Mar. 31-Apr. 3, 2007, pp. 1-11, Society of Petroleum Engineers.

Penny, G., et al., "The application of microemulsion additives in drilling and stimulation results in enhanced gas production," SPE 94274, SPE Production and Operations Symposium, Oklahoma City, Oklahoma, Apr. 17-19, 2005, pp. 1-9, Society of Petroleum Engineers.

Ahmad, M., et al., "Ortho ester hydrolysis: direct evidence for a three-stage reaction mechanism," XP002322843, 1 page.

Akzo Nobel Material Safety Data Sheet entitled "ETHOMEEN® SV/12," May 7, 2003, 6 pages, Akzo Nobel Surface Chemistry LLC, Akzo Nobel Chemicals Ltd.

Albertsson, Ann-Christine, et al., "Aliphatic polyesters: synthesis, properties and applications," Advances in Polymer Science, 2002, pp. 1-161 plus 2 Preface pages, vol. 157, Springer-Verlag Berlin Heidelberg.

Baroid Fluid Services brochure entitled "BARACARB® bridging agent," Apr. 2005, 2 pages, Halliburton.

Baroid Fluid Services brochure entitled "GELTONE® II viscosifier," 2006, 1 page, Halliburton.

Baroid Fluid Services brochure entitled "LE SUPERMOL™ emulsifier," 2006, 1 page, Halliburton.

Baroid Fluid Services brochure entitled "N-FLOW™ filter cake breaker systems," Jan. 2007, 2 pages, Halliburton.

Baroid Fluid Services brochure entitled "N-FLOW(SM) services," 1 page, Halliburton.

Baroid Fluid Services brochure entitled "RHEMOD™ L viscosifier/suspension agent," 2006, 1 page, Halliburton.

Biehn, G. F., et al., "Polyvinyl alcohol as an emulsifying agent,"pp. 1449-1453, vol. 40, No. 8, Industrial and Engineering Chemistry, Aug. 1948.

Bowmer, C. T., et al., "The ecotoxicity and the biodegradability of lactic acid, alkyl lactate esters and lactate salts," Chemosphere, 1998, pp. 1317-1333, vol. 37, No. 7, Elsevier Science Ltd, Great Britain.

Cantu, Lisa A., et al., "Laboratory and field evaluation of a combined fluid-loss-control additive and gel breaker for fracturing fluids," SPE Production Engineering, Aug. 1990, pp. 253-260, Society of Petroleum Engineers.

Chatterji, J., et al., "Applications of water-soluble polymers in the oil field," Journal of Petroleum Technology, Nov. 1981, pp. 2042-2056, The Society of Petroleum Engineers of AIME.

Chiang, Y., et al., "Hydrolysis of ortho esters: further invesetigation of the factors which control the rate-determining step," XP002322842, 1 page, Nov. 16, 1083.

Colon, A. Alberto, et al., "The hydrolysis of some alkyl lactates. II. "Neutral" and acid hydrolyses," Dec. 5, 1953, pp. 6074-6075 plus 1 publication page, The Journal of the American Chemical Society.

Cordes, E. H., et al., "Mechanism and catalysis for hydrolysis of acetals, ketals, and ortho esters," 1974, pp. 581-603, vol. 74, No. 5, Chemical Reviews.

Daccord, Gérard, et al., "Acidizing physics," Reservoir Stimulation, pp. 13-1 to 13-13, Dowell Schlumberger.

Davison, J. M., et al., "Oil-based muds for reservoir drilling: their performance and cleanup characteristics," SPE 58798, SPE International Symposium on Formation Damage, Lafayette, Louisiana, Feb. 23-24, 2000, pp. 1-11, Society of Petroleum Engineers.

Dechy-Cabaret, Odile, et al., "Controlled ring-opening polymerization of lactide and glycolide," Chemical Reviews, 2004, pp. A to Z plus AA to AD, American Chemical Society.

Designation: G111—97, "Standard guide for corrosion tests in high temperature or high pressure environment, or both," Dec. 1997, pp. 1-5 plus 1 license agreement page, ASTM International.

Designation: G111—97 (Reapproved 2006), "Standard guide for corrosion tests in high temperature or high pressure environment, or both," May 2006, pp. 1-5 plus 1 license agreement page, ASTM International.

Filachione, E. M., et al., "Preparation of methyl lactate," Apr. 1945, pp. 388-390, vol. 37, No. 4, Industrial and Engineering Chemistry.

Foreign communication from a related counterpart application—International Search Report, PCT/GB2007/003754, Mar. 13, 2008, 3 pages.

Funkhouser, Gary P., et al., "Synthetic polymer fracturing fluid for high-temperature applications," SPE 80236, SPE International Symposium on Oilfield Chemistry, Houston, Texas, Feb. 5-7, 2003, pp. 1-6, Society of Petroleum Engineers Inc.

Halliburton brochure entitled "Cobra Frac(SM) service: coiled tubing fracturing—cost-effective method for stimulating untapped reserves," 2000, 2 pages, Halliburton Energy Services, Inc.

Halliburton brochure entitled "CobraJet Frac(SM) service: cost-effective technology that can help reduce cost per BOE produced, shorten cycle time and reduce capex," 2 pages, Halliburton Communications.

Halliburton brochure entitled "Musol®: mutual solvent," Feb. 2007, 2 pages, Halliburton Communications.

Halliburton brochure entitled "Musol® A: mutual solvent," 1998, 2 pages, Halliburton Energy Services, Inc.

Halliburton brochure entitled "N-Flow(SM) AO Stimulation Service," Aug. 2005, 2 pages, Halliburton Communications.

Halliburton, "SurgiFrac(SM) service: a quick and cost-effective method to help boost production from openhole horizontal completions," Oct. 2002, 2 pages, Halliburton.

Heller, Jorge, et al., "Poly(ortho esters) for the pulsed and continuous delivery of peptides and proteins," Controlled Release and Biomedical Polymers Department, SRI International, Menlo Park, California, pp. 39-56.

Heller, Jorge, et al., "Poly(ortho esters)—from concept to reality," Biomacromolecules, Sep./Oct. 2004, pp. 1625-1632, vol. 5, No. 5, American Chemical Society.

Heller, Jorge, et al., "Poly(ortho esters): synthesis, characterization, properties and uses," Advanced Drug Delivery Reviews, 2002, pp. 1015-1039, vol. 54, Elsevier Science B.V.

Heller, J., et al., Poly(ortho ester)s—their development and some recent applications, European Journal of Pharmaceutics and Biopharmaceutics, 2000, pp. 121-128, vol. 50, Elsevier Science B.V.

Heller, J., et al., Release of norethindrone from poly(ortho esters), Mid-Aug. 1981, pp. 727-731, vol. 21, No. 11, Polymer Engineering and Science.

Holland, John M., et al., "Hydrolysis of alkyl acetates in a phosphate-buffered aqueous medium," Mar. 1961, pp. 463-466, vol. 65.

Howard, William L., "Chelating agents," pp.764-795, vol. 5, no title page.

Kajiyama, Tetsuto, et al., "Improved synthesis with high yield and increased molecular weight of poly (a, β-malic acid) by direct polycondensation," Biomacromolecules, 2004, pp. 169-174, vol. 5, No. 1, American Chemical Society.

Katritzky, Alan R., et al., Aquathermolysis: reactions of organic compounds with superheated water, Acc. Chem. Res., 1996, pp. 399-406, vol. 29, No. 8, American Chemical Society.

Kellog, David R., "The effect of neutral salts on hydrolysis by water," 1909, pp. 886-900 plus 1 publication page, vol. 31, The Journal of the American Chemical Society.

Kellogg, David R., "The effect of neutral salts on hydrolysis by water," 1909, pp. 403-405 plus 1 publication page, vol. 31, The Journal of the American Chemical Society.

Love, T.G., et al., "Selectively placing many fractures in openhole horizontal wells improves production," SPE 50422, SPE International Conference on Horizontal Well Technology, Calgary, Alberta, Canada, Nov. 1-4, 1998, pp. 1-8, Society of Petroleum Engineers, Inc.

Mabey, W., et al., "Critical review of hydrolysis of organic compounds in water under environmental conditions," Stanford Research Institute, Menlo Park, California, 1978, pp. 383-410, vol. 7, No. 2, J. Phys. Chem. Ref. Data.

Malm, C. J., et al., "Evaluating cellulose acetylation reactivity," Apr. 1957, pp. 763-768, vol. 49, No. 4, Industrial and Engineering Chemistry.

Malm, Carl J., et al., "Hydrolysis of cellulose esters," Jan. 1966, pp. 81-87, vol. 5, No. 1, I&EC Process Design and Development.

Malm, C. J., et al., "The action of fatty acids on cellulose," Jan. 1929, pp. 274-278 plus 1 publication page, vol. 51, The Journal of the American Chemical Society.

Matsuyama, Kiyoshi, et al., "Environmentally benign formation of polymeric microshperes by rapid expansion of supercritical carbon dioxide solution with a nonsolvent," Environmental Science & Technology, 2001, pp. 4149-4155, vol. 35, No. 20, American Chemical Society.

McDaniel, B. W., et al., "Evolving new stimulation process proves highly effective in level 1 dual-lateral completion," SPE 78697, SPE Eastern Reginal Meeting, Lexington, Kentucky, Oct. 23-25, 2002, pp. 1-11, Society of Petroleum Engineers Inc.

Mikhailov, M., et al., "An experimental investigation of drilling-fluid filter-cake removal by acid jetting,"SPE 112373, SPE International Symposium and Exhibition on Formation Damage Control, Lafayette, Louisiana, Feb. 13-15, 2008, pp. 1-9, Society of Petroleum Engineers.

Myers, R. Thomas, et al., "The rate of saponification of acetates of unsaturated alcohols," Apr. 1952, pp. 461-463, vol. 56.

Office Action dated Feb. 10, 2009 (9 pages), U.S. Appl. No. 11/622,907, filed Jan. 12, 2007.

Office Action dated Jun. 4, 2009 (69 pages), U.S. Appl. No. 12/120,159, filed May 13, 2008.

Office Action dated Jun. 10, 2010 (13 pages), U.S. Appl. No. 12/120,159, filed May 13, 2008.

MICROEMULSIFIERS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure generally relates to wellbore servicing fluids. More particularly, this disclosure relates to microemulsifiers and methods of making and using same.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the casing and the walls of the wellbore.

During drilling and as the drilling fluid is circulated upward through the annulus, a thin layer of residue is deposited on the annulus between the exterior of the drill string and/or the casing and the walls of the wellbore. The thin layer of residue is referred to as a filtercake and aids in controlling drilling fluid from leaking-off into the subterranean formation. After drilling and casing the wellbore, the well has to be emptied of drilling mud before it can be completed. Additionally, prior to production, the casing may be cleaned (e.g., removal of oleaginous fluid contaminants) and/or the filtercake removed. Cleaning of the casing may improve adherence of the casing to the cement composition used to seal the annulus and removal of the filtercake may be advantageous as its presence would restrict the inflow of hydrocarbons into the wellbore. The completion fluid used to displace the drilling mud is typically a brine composed of water and a suitable salt (e.g., sodium chloride, zinc bromide, calcium chloride) and may contain additional components that facilitate the cleaning of the casing and/or the removal of the filtercake. Such additional components should promote the efficient cleaning of the casing and/or removal of the filtercake while in contact with the high salinity solution (e.g., brine). For example, the completion fluid may contain one or more surfactants such as cationic, anionic, and non-ionic surfactants. A non-ionic surfactant may be considered for use in high salinity solutions (e.g., brines) due to their increased salt tolerance and indifference to multivalent ions. However, drawbacks to the use of non-ionic surfactants in a completion fluid include the presence of an upper temperature limit for stability of microemulsions comprising the non-ionic surfactants. Without wishing to be limited by theory, this thermal instability may be attributable to dehydration of ethoxylate groups of the non-ionic surfactant as the temperature is increased. This phenomenon is referred to as the cloud point and it is where the non-ionic surfactant has a drastic reduction in its solubility causing it to phase separate. Additionally, a specific non-ionic surfactant may have to be chosen for a removal of a specific oleaginous fluid and as such may display a reduced versatility when compared to other types of surfactants.

A cationic or anionic surfactant while displaying increased stability and versatility when compared to a non-ionic surfactant may also have drawbacks associated with its use. For example, anionic surfactants may exhibit reduced effectiveness in brines composed of multivalent ions (e.g. $Ca^{2+}$ or $Zn^{2+}$) while cationic surfactants which are compatible with most completion brines typically have toxicity issues associated with their use. Thus, it would be desirable to develop compositions and methods for cleaning a casing and/or removing a filtercake from a subterranean formation that are compatible with brines.

SUMMARY

Disclosed herein is a method comprising contacting a zwitterionic surfactant, co-surfactant, and water to form a microemulsifier, and contacting the microemulsifier with an oleaginous fluid under low shear conditions to form a microemulsion.

Also disclosed herein is a method comprising introducing a first wellbore servicing fluid comprising at least one oleaginous fluid into a wellbore, wherein the first wellbore servicing fluid forms oil-wet solids and/or oil-wet surfaces in the wellbore, and contacting the oil-wet solids and/or oil-wet surfaces in the wellbore with a second wellbore servicing fluid comprising a zwitterionic surfactant, a co-surfactant, and a brine to form a microemulsion.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
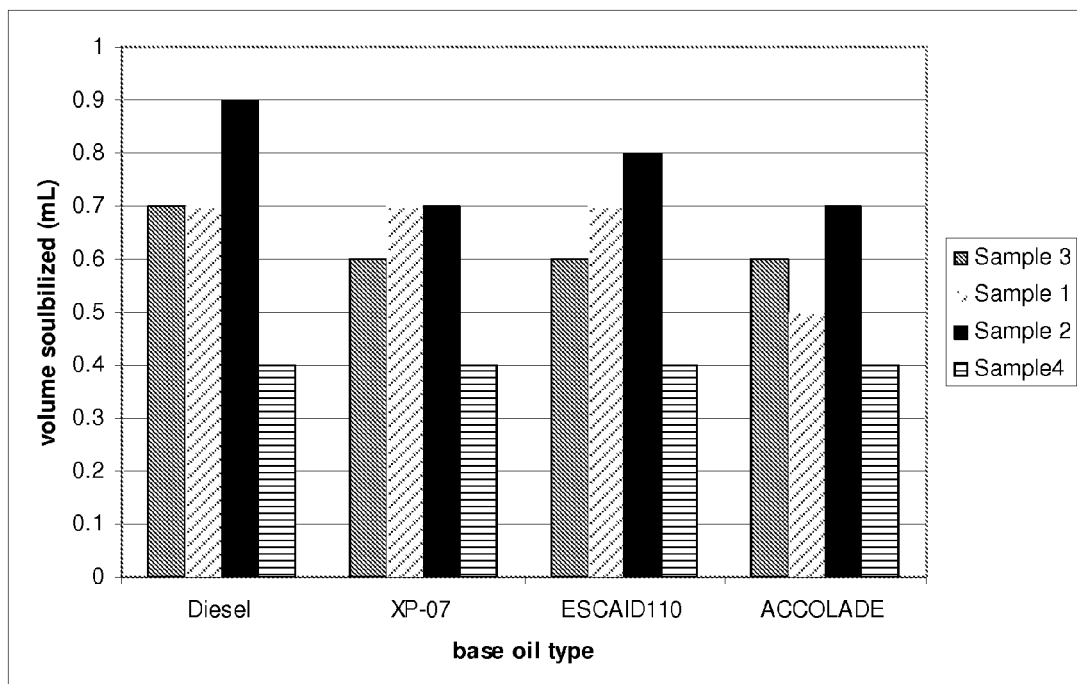
FIG. 1 is a plot of volume of oil solubilized as a function of base oil type for the samples from Example 1.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are compositions comprising a surfactant and a co-surfactant. In an embodiment the surfactant is zwitterionic and the composition comprising the zwitterionic surfactant and co-surfactant is termed a surfactant package (SP). The SP may act as a microemulsifier that when contacted with one or more oils form an oil-in-water emulsion. Also disclosed herein are oilfield servicing fluids (OSF) comprising the SP and a brine. In an embodiment, the OSFs are placed downhole and contacted with an oleaginous fluid (i.e., an oil-containing fluid) to form a microemulsion. The oleaginous fluid may be oil-based residue on one or more components of a wellbore, oil-wet solids such as those found in an oil-based filtercake and the like. In some embodiments, the OSF may be used for removing oil-based residue from a casing such as in a cased completion and may also be referred to as a cleaning fluid. In other embodiments, the OSF may be used for the removing the oil-wet components of a filtercake such as in an open-hole completion. The components of the OSFs as well as methods of making and using same will be described in more detail later herein.

In an embodiment, the SP comprises a zwitterionic surfactant. Surfactants in general are wetting agents that lower the surface tension of a liquid in which they are dissolved, allowing easier spreading and decreasing the interfacial tension between two liquids. Zwitterionic surfactants are electrically neutral surfactants that carry both a formal positive and a formal negative charge on different atoms in the same molecule. Such surfactants are characterized by a high solubility in water, low solubility in organic solvents, and increased stability at higher temperatures when compared to other types of surfactants (e.g., non-ionic surfactants).

For the purposes of this disclosure a zwitterionic surfactant will be used in conjunction with a co-surfactant to form a microemulsion. Zwitterionic surfactants may provide the most universal behavior across all brine types and are essentially non-toxic. Examples of zwitterionic surfactants suitable for use in this disclosure include without limitation alkyl amine oxides, alkyl betaines, alkyl amidopropyl betaine, alkyl sulfobetaines, alkyl sultaines, dihydroxyl alkyl glycinate, alkyl ampho acetate, phospolipids, alkyl aminopropionic acids, alkyl imino monopropionic acids. alkyl imino dipropionic acids, or combinations thereof.

In an embodiment, the zwitterionic surfactant comprises an amine oxide. Amine oxides, also termed amine N-oxides or N-oxides, are chemical compounds that comprise the functional group $R_3N^+$—$O^-$ where R may be an alkyl moiety having from 1 to 20 carbon atoms. The term amine oxide herein is meant to comprise oxides of tertiary amines including nitrogen containing aromatic compounds, analogous primary or secondary amines, derivatives thereof, or combinations thereof. Examples of amine oxides suitable for use in this disclosure include without limitation decylamine oxide, dodecylamine oxide, tetradecylamine oxide, or combinations thereof.

In an embodiment, the zwitterionic surfactant comprises a betaine. Betaines are neutral chemical compounds comprising a positively charged cationic functional group and no hydrogen atom and a negatively charged functional group that may not be adjacent to the cationic site. For example, a betaine may comprise an onium ion (e.g., ammonium, phosphonium) and a carboxylate group. Examples of betaines suitable for use in this disclosure include without limitation laurylamidopropyl betaine, decyl betaine, dodecyl betaine, or combinations thereof.

In an embodiment, the zwitterionic surfactant comprises a phospholipid. Phospholipids are similar in structure to triglycerides with the exception that the first hydroxyl of the glycerine molecule has a polar phosphate containing group in place of the fatty acid. The hydrocarbon chain of the phospholipid is hydrophobic while the charges on the phosphate groups make that portion of the molecule hydrophilic resulting in an amphiphilic molecule. Examples of phospholipids suitable for use in this disclosure include without limitation lecithin, phosphatidyl choline, derivatives thereof, or combinations thereof.

In an embodiment, the zwitterionic surfactant may be present in the SP in an amount of from about 10 weight percent (wt. %) to about 90 wt. % based on the total weight percentage of the SP, alternatively from about 20 wt. % to about 80 wt. %, alternatively from about 30 wt. % to about 70 wt. %.

In an embodiment, the SP comprises a co-surfactant. Generally, co-surfactants are hydrophobic materials that synergistically act with the surfactant to reduce the interfacial tension between two liquids. In an embodiment, the co-surfactant comprises any hydrophobic material compatible with the other components of the SP that does not self-assemble or self-aggregate. Examples of co-surfactants suitable for use in this disclosure include without limitation alkyl alcohols (e.g., methanol, ethanol, propanol, butanol, etc.), alkyl acetate, alkyl pyrollidone (e.g., n-octyl-2-pyrollidone, n-methyl pyrollidone, etc.), alkyl ketone, acryl amide, or combinations thereof. In an embodiment, the co-surfactant comprises butanol. In another embodiment, the co-surfactant comprises n-octyl-2-pyrollidone.

In an embodiment, the co-surfactant may be present in the SP in an amount of from about 10 wt. % to about 90 wt. % based on the total weight percentage of the SP, alternatively from about 20 wt. % to about 80 wt. %, alternatively from about 30 wt. % to about 70 wt. %.

In an embodiment, the SP may be contacted with fresh water to form a microemulsifier. In an alternative embodiment, the SP is contacted with a brine to form an OSF. Brines are aqueous fluids that are typically saturated or nearly saturated with salt. In an embodiment, the OSF comprises a brine that comprises a salt at a concentration below saturation such that the brine contains some amount of free water. In an embodiment, OSFs of the type described herein may comprise any brine solution compatible with the other components of the OSF and the intended function of the OSF.

Examples of brines suitable for use in this disclosure include without limitation saturated or partially saturated aqueous solutions comprising halide-containing salts, alkali metal salts, alkaline metal salts, formate-containing compounds, sodium bromide (NaBr), calcium chloride ($CaCl_2$), calcium bromide ($CaBr_2$), sodium chloride (NaCl), zinc bromide ($ZnBr_2$), ethyl formate, sodium formate, cesium formate, potassium formate, methyl formate, methyl chloro formate, triethyl orthoformate, trimethyl orthoformate, derivatives thereof, or combinations thereof. In some embodiments, the SP is contacted with a brine prepared from a mixture of two or more salts. In such embodiments, the brine mixture may be formed by contacting the constituent brines in any ratio compatible with their intended use.

The choice of brine may be dictated by a variety of factors such as the formation condition and the desired density of the resulting solution. In an embodiment, the brine comprises a saturated or partially saturated aqueous solution containing NaBr, alternatively $CaCl_2$, alternatively a mixture of $CaCl_2$/ $CaBr_2$. In an embodiment, the brine may have a density of from about 8.5 ppg to about 15.1 ppg, alternatively from about 8.5 ppg to about 12.5 ppg, alternatively form about 10.5 ppg to about 11.6 ppg.

In an embodiment, a method of preparing an OSF comprises preparing an SP by contacting a zwitterionic surfactant and a co-surfactant of the type described previously herein. In an embodiment, the SP may have a zwitterionic surfactant: co-surfactant mole ratio of from about 1:10 to about 10:1, alternatively from about 1:5 to about 5:1, alternatively from about 1:0.1 to about 0.1:1.

In an embodiment, the surfactant:co-surfactant ratio is chosen so as to prevent phase separation and provide a single phase microemulsifier when contacted with the brine. Further, the surfactant:co-surfactant mole ratio may be chosen so as prevent precipitation of one or both components of the SP when contacted with the brine. Contacting of the zwitterionic surfactant and the co-surfactant may be carried out using any suitable technique (e.g., mixing, blending, etc.) and under any suitable conditions.

In an embodiment, the SP comprises laurylamidopropyl betaine and butanol in a 1:4.8 mole ratio. Alternatively, the SP comprises dodecylamine oxide and butanol in a 1:2 mole ratio. Alternatively, the SP comprises decylamine oxide and n-octyl-2-pyrillidone in a 1:2 mole ratio. Alternatively, the SP comprises decylamine oxide and butanol in a 1:2 mole ratio.

The method may further comprise contacting the SP with a fluid comprising some amount of free water. In an embodiment, the fluid is an aqueous solution, alternatively a partially saturated brine. The fluid and SP may be contacted in any manner known to one of ordinary skill in the art with the benefits of this disclosure.

In an embodiment, the SP or OSF is able to form an oil-in-water emulsion (microemulsion) upon contacting with an oleaginous fluid. Microemulsions are thermodynamically stable mixtures of oil, water (e.g., brine), and surfactant (e.g., zwitterionic surfactant and co-surfactant). In contrast to conventional emulsions, microemulsions of this disclosure form spontaneously or almost spontaneously upon contacting of the components under low shear conditions which are in contrast to the conditions generally used in the formation of conventional emulsions.

In order for an emulsion to form spontaneously or almost spontaneously upon contacting of the components, there has to be a reduction in the free energy of the system. This reduction in free energy is brought about by an increase in conformational entropy, a reduction in surface tension, and a decrease in curvature energy. The free energy change of a system is represented by the following equation 1 or 2:

$$\Delta G = \Delta H - T \Delta S \quad \text{Equation 1}$$

$$\Delta G = \Delta A \cdot \gamma_{ow} - T \Delta S \quad \text{Equation 2}$$

where G is the Gibbs free energy, T is the temperature, S is the entropy, A is the interfacial area, and γ is the interfacial tension at the oil-water interface. The entropy is increased by the creation of several small droplets, however, the creation of these droplets also causes a large increase in the oil/water interfacial area. The amount of surface area created is enormous and generating a large energy penalty from contacting oil/water. This energy penalty must be reduced by the addition of surfactants which lower the interfacial tension, thus reducing the amount of energy to form an interface. Generally emulsification is a non-spontaneous process such that $\Delta A \cdot \gamma_{ow} \gg T \Delta S$. However, the amount of thermodynamic energy required to create the new interface ($\Delta A \cdot \gamma_{ow}$) is small when compared with the amount of energy that is required to form a conventional emulsion. The additional energy required is due to the interfacial curvature. The energy required to change the interfacial curvature can be represented by the following equation 3:

$$F = \int dA \cdot \{(\kappa/2)(c_1 + c_2 - 2c_0)^2 - \bar{\kappa} c_1 c_2\} + NkTf(\Phi) \quad \text{Equation 3}$$

where κ is the bending modulus, $\bar{\kappa}$ is the Gaussian modulus, $c_1$ and $c_2$ are the radii of curvature, $c_0$ is the spontaneous curvature and $NkTf(\Phi)$ is the entropic in origin. The addition of a co-surfactant to the system reduces the κ term, thus reducing the energy required to produce a curved surfactant film at the oil/water interface.

In an embodiment, an SP and/or OSF of the type described herein when contacting an oleaginous fluid is able to form an oil-in-water emulsion in less than about 10 minutes, alternatively less than about 5 minutes, alternatively about instantaneously under low shear conditions. Herein low shear conditions refer to the ability of the SP and/or OSF when contacted with the oleaginous fluid to form an oil-in-water emulsion in the absence of substantial agitation.

In an embodiment, an SP and/or OSF of the type described herein when contacting an oleaginous fluid is able to form an oil-in-water emulsion spontaneously. Without wishing to be limited by theory, the spontaneous formation of oil-in-water may have a Gibbs free energy of equal to or less than about 0.

In an embodiment, the amount of oleaginous fluid solubilized by an OSF and/or SP of the type described herein is from about 0.01 ml to about 1.0 ml of oleaginous fluid per 1 ml of a 30 wt. % solution of OSF, alternatively from about 0.01 ml to about 0.5 ml of oleaginous fluid per 1 ml of a 15 wt. % solution of OSF, alternatively from about 0.01 ml to about 0.25 ml of oleaginous fluid per 1 ml of a 7.5 wt. % solution of OSF, alternatively from about 0.01 ml to about 0.9 ml of oleaginous fluid per 1 ml of a 30 wt. % solution of OSF, alternatively from about 0.01 ml to about 0.8 ml of oleaginous fluid per 1 ml of a 30 wt. % solution of OSF.

OSFs of the type described herein may exhibit thermal stability as assessed by their ability to emulsify the oleaginous fluid after being contacted with brine and statically aged at a temperature of from about 65° F. to about 350° F., alternatively from about 70° F. to about 200° F., alternatively from about 75° F. to about 120° F. for a period of from about 1 hours to about 240 hours, alternatively from about 1 hours to about 120 hours, alternatively from about 1 hours to about 24 hours.

In an embodiment, a method of servicing a wellbore comprises drilling a wellbore in a subterranean formation and introducing to the subterranean formation a wellbore servicing fluid that comprises at least one oleaginous fluid, wherein oil-coated/wet solids (e.g., filtercake, drill cuttings, etc.) and/or oil-coated wet surfaces (e.g., casing, drill string, etc.) are formed as a result. It is to be understood that "subterranean formation" encompasses both areas below exposed earth and areas below earth covered by water such as ocean or fresh water. Oleaginous fluids herein refer to oil-based drilling or servicing fluids, invert emulsions, servicing fluids comprising substantially no aqueous component, and the like. Examples of the oleaginous fluids suitable for use in this disclosure include without limitation olefins, internal olefin based oils, mineral oil, kerosene, diesel oil, fuel oil, synthetic oil, linear or branched paraffins, esters, acetals, mixtures of crude oil, derivatives thereof, or combinations thereof. In some embodiments, after drilling, the method further comprises running a casing in the wellbore and securing the casing into position against the subterranean formation using a sealant composition (e.g., cement).

After drilling and/or casing the wellbore, a completion operation is performed to prepare the wellbore to produce hydrocarbons. The completion operation includes first perforating the subterranean formation by introducing a perforating fluid into the wellbore and jetting the perforating fluid from the wellbore to the subterranean formation thereby forming perforation tunnels within the subterranean formation. In an embodiment, the introduction of an oleaginous fluid (e.g., drilling fluid, perforating fluid) may result in the formation of oil-wet solids and/or oil wet surfaces within the wellbore. The oil-wet solids and/or surfaces may be oil-based residue located on the components of the wellbore, the walls of a casing, a formation face, a fracture face, a perforation, on a screen (e.g., a gravel pack screen) or another piece of equipment located in the wellbore or subterranean formation, an oil-based filtercake, or a water-based filtercake that has been contaminated with oil.

An OSF of the type described herein may be introduced to the wellbore and contacted with the oil-based fluid, oil-wet solids, and/or oil-wet surfaces resulting in the formation of an oil-in water emulsion. In an embodiment, the OSF introduced into the wellbore is a completion fluid comprising a brine, a surfactant (e.g., laurylamidopropyl betaine) and a co-surfactant (e.g., butanol). Herein, a completion fluid refers to a solids-free liquid used to "complete" an oil or gas well. This fluid is placed in the well to facilitate final operations prior to initiation of production, such as setting screens production liners, packers, downhole valves or shooting perforations into the producing zone. The fluid is meant to control a well should downhole hardware become functionally compromised, without damaging the producing formation or completion components.

In an embodiment where a casing is run in the wellbore (i.e., well-cased wellbore), the oil-based fluid and/or oil-wet solids and/or surface may be on walls of the casing. In such an embodiment, the OSF may contact the oil-based fluid on the sides or surfaces of the casing. Upon contact with the oil-based fluid, the OSF forms microemulsions that are subsequently removed from the wellbore.

In another embodiment (i.e., open-hole wellbore), the oil-based fluid and/or oil-wet solids and/or surface may be a filtercake formed along the walls of the wellbore. In such an embodiment, the OSF may form a microemulsion upon contacting the oil-wet components of the filtercake. As will be understood by one of ordinary skill in the art, removal of the oil-wet components may increase the susceptibility of the filtercake to degradation by other agents (e.g., acid). Methods of removing a filtercake comprising oil-wet components are described for example in U.S. patent application Ser. No. 12/120,159 entitled "Compositions and Methods for the Removal of Oil-Based Filtercakes" filed May 13, 2008 and incorporated by reference herein in its entirety.

The method may further comprise fracturing the subterranean formation by injecting fracturing fluids into the perforation tunnels thereby propagating fractures from the perforation tunnels deeper into the subterranean formation. Production can then take place, if desired or appropriate, as for example in a hydrocarbon-producing well.

In an embodiment, the SP, OSF, or both are used to remove oleaginous fluid from one or more oil-wet solids and/or oil-wet surfaces located outside of a wellbore. For example, the SP may be contacted with the surface of one or more materials that have been contacted with an oleaginous fluid. In such embodiments, the SP may be contacted with drill cuttings, wellbore servicing equipment, and the like which have oleaginous fluid present on the surfaces of the materials. Contacting of the SP with these materials may result in the formation of microemulsions and the removal of the oleaginous fluid from the surfaces of these materials.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The ability of OSFs of the type described herein to form microemulsions when contacted with various oils was investigated. The various oils used were diesel, ESCAID 110, XP-07 and ACCOLADE. ESCAID 110 hydrocarbon fluid is a petroleum distillate commercially available from EXXON-MOBIL Corp; XP-07 is a paraffin base oil; and ACCOLADE is an olefin/ester blend both of which are commercially available from Halliburton Energy Services Four OSF samples, designated Samples 1-4, were prepared. Sample 1 comprised laurylamidopropyl betaine and butanol in a mole ratio of 1:4.8. Sample 2 comprised dodecylamine oxide and butanol in a mole ratio of 1:4. Sample 3 comprised decylamine oxide and n-octyl-2-pyrollidone in a mole ratio of 1:2. Sample 4 comprised decylamine oxide and butanol in a mole ratio of 1:2.

Sodium bromide brine was added to each of the zwitterionic surfactant/co-surfactant solution at a 1:1 volume ratio to form Samples 1-4 having 15 wt. % zwitterionic surfactant/co-surfactant in 10.5 ppg sodium bromide. The components of each sample are summarized in Table 1.

TABLE 1

| Sample | Zwitterionic Surfactant | Co-surfactant | Zwitterionic Surfactant:Co-surfactant Mol Ratio | Brine | Brine Concentration in OSF |
|---|---|---|---|---|---|
| 1 | laurylamidopropyl betaine | butanol | 1:4.8 | NaBr | 10.5 ppg |
| 2 | dodecyl amine oxide | butanol | 1:4 | NaBr | 10.5 ppg |
| 3 | decyl amine oxide | n-octyl-2-pyrollidone | 1:2 | NaBr | 10.5 ppg |
| 4 | decyl amine oxide | butanol | 1:2 | NaBr | 10.5 ppg |

Between about 0.4 ml and about 0.9 ml of the oils were added to vials containing 4 ml of the OSF sample. The vials were rolled once or twice to provide low shearing. Microemulsions were observed to form in less than about 45 seconds after the vials were rolled. FIG. 1 is a plot of volume of oil solubilized as a function of oil type for Samples 1-4. The results showed that the OSF samples were able to form microemulsions when contacted with the oils under low shear conditions.

The ability of the OSFs to emulsify oil in the presence of solid particles was also investigated. Four samples were prepared; each sample contained 4 ml of either Samples 1, 2, 3, or 4 and 0.5 ml of ACCOLADE field mud. The samples were rolled once or twice to provide low shearing and formed a microemulsion. The ACCOLADE field mud was ACCOLADE base fluid with standard drilling fluid additives including barite as a weighting agent. It was observed that the base fluid was removed from the solid particles leaving them water wet. Further, Sample 1 was observed to effect the largest removal of ACCOLADE from solid particles. Without wishing to be limited by theory, the better performance of Sample 1 (which comprised a betaine as the zwitterionic surfactant) when compared to Samples 2-4 (which comprised an amine oxide as the zwitterionic surfactant) may be attributable to the fact that betaine formally has two full charges while amine oxides formally have two partial charges. The full charges on the betaine may increase the surface activity of the molecule, which could increase the ability of OSFs comprising the betaines to remove from the particle surface and solubilize oil when compared to OSFs comprising amine oxides.

Example 2

The thermal stability of the OSFs was investigated. Three OSF samples, designated Samples 5-7, were prepared. Sample 5 comprised dodecylamine oxide and butanol in a 1:4 mole ratio and was contacted with a 10.5 ppg NaBr brine. Sample 6 comprised dodecylamine oxide and butanol in a 1:4 mole ratio and was contacted with a 11.0 ppg $CaCl_2$ brine. Sample 7 comprised dodecylamine oxide and butanol in a 1:4 mole ratio and was contacted with a 13.5 ppg mixture of $CaCl_2$ and $CaBr_2$ brine. Table 2 tabulates the components, ratios and concentrations of Samples 5-7.

TABLE 2

| Sample | Zwitterionic Surfactant | Co-surfactant | Zwitterionic Surfactant:Co-surfactant Mol Ratio | Brine | Brine Concentration in OSF |
|---|---|---|---|---|---|
| 5 | dodecyl amine oxide | butanol | 1:4 | NaBr | 10.5 ppg |
| 6 | dodecyl amine oxide | butanol | 1:4 | $CaCl_2$ | 11.0 ppg |
| 7 | dodecyl amine oxide | butanol | 1:4 | $CaCl_2/CaBr_2$ | 13.5 ppg |

Static aging tests were performed on Samples 5-7 by heating each sample in an oven at 250° F. for 16 hours. The aged OSF samples were then visually observed. Both Samples 5 and 6 showed slight yellowing while Sample 7 was clear. The capability of aged OSF samples to dissolve oil was investigated by adding base oils of the type described in Example 1 to samples 5-7. All the samples retained their capability to dissolve the various oils under low shear conditions.

Example 3

The ability of OSFs, referred to also as cleaning fluids, to solubilize oil-based drilling muds was investigated and compared to conventional casing cleaners. The OSFs were Samples 1 and 2 from Example 1. The conventional cleaners were BARASCRUB, designated Sample 3, which is a casing wash that is commercially available from Halliburton Energy Services, Inc. and a casing wash that is commercially available, designated as Sample 4. BARASCRUB and Sample 4 are not compatible with any brine. The oil-based drilling mud was 15 ppg ACCOLADE. The cleaning tests were performed at 40° F., 75° F., and 120° F. and the samples were heated to the cleaning test temperatures prior to use.

Cleaning tests were carried out by smearing ACCOLADE onto the inside of a 400 ml PYREX glass beaker between the 75 ml and 200 ml marks on the beaker. The beaker was also weighted prior to and after smearing the beaker with ACCOLADE to determine the mass of ACCOLADE used. 175 ml of sample was added to the beaker smeared with ACCOLADE. The beaker was then placed in a double walled circulation bath filled with water to maintain constant temperature during the cleaning tests. Each sample was mixed for 10 minutes with a FANN 35A rheometer, which is commercially available from Fann Instruments, Inc. The test speeds used were 600 rpm, 300 rpm, and 100 rpm. At the end of the cleaning tests, the beaker was removed from the circulation bath and the OSF poured out. The beaker was gently washed with 10-50 ml of deionized water and ethanol. If there was any ACCOLADE on the bottom of the beaker, the ACCOLADE was assumed to have been removed from the beaker walls.

The beaker was then either placed in a vacuum oven set to room temperature and dried out under vacuum for 30 minutes or dried in a vacuum oven at temperatures ranging from 120° F. to 150° F. for at least 4 hours. The beaker was then weighted to measure the remaining amount of ACCOLADE.

Figure 2:
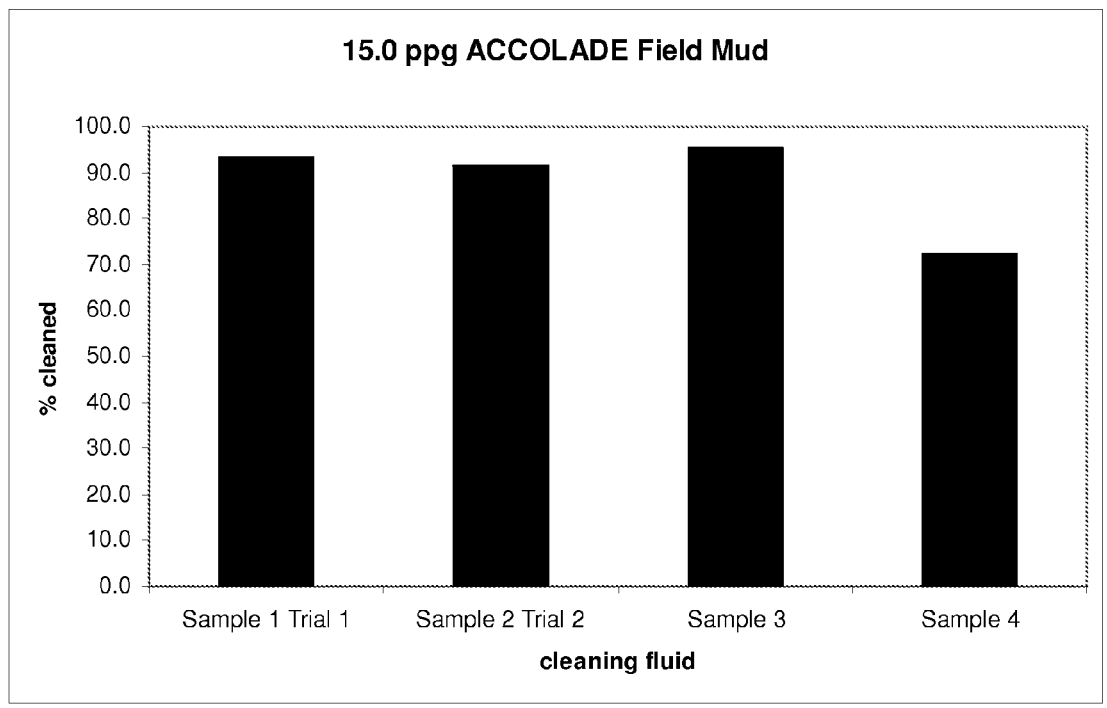
FIG. 2 is a plot of percentage oil cleaned as a function of cleaning fluid for the samples from Example 3.

The results demonstrate that Sample 3 removed all traces of ACCOLADE; however, it had low density (about 7 ppg) and was not compatible with any brine. FIG. 2 is a plot of percentage ACCOLADE cleaned as a function of sample type for the cleaning test performed at 75° F. and the test speed of 300 rpm. The results demonstrated that Samples 1 and 2 were able to remove more than 90% of ACCOLADE from the beaker; however, Sample 4 was able to remove about 70% ACCOLADE. Sample 4 also had a low density (about 7.5 ppg) and was not compatible with any brine. When additional water was added to Sample 4, the sample was observed to become an opaque solution, which suggested that Sample 4 did not form a microemulsion with water. Without wishing to be limited by theory, the opaque solution was a short lived kinetically stabilized emulsion. Sample 4 with the additional water solution would phase separate into two phases within an hour demonstrating this is a highly unstable emulsion.

Example 4

Figure 3:
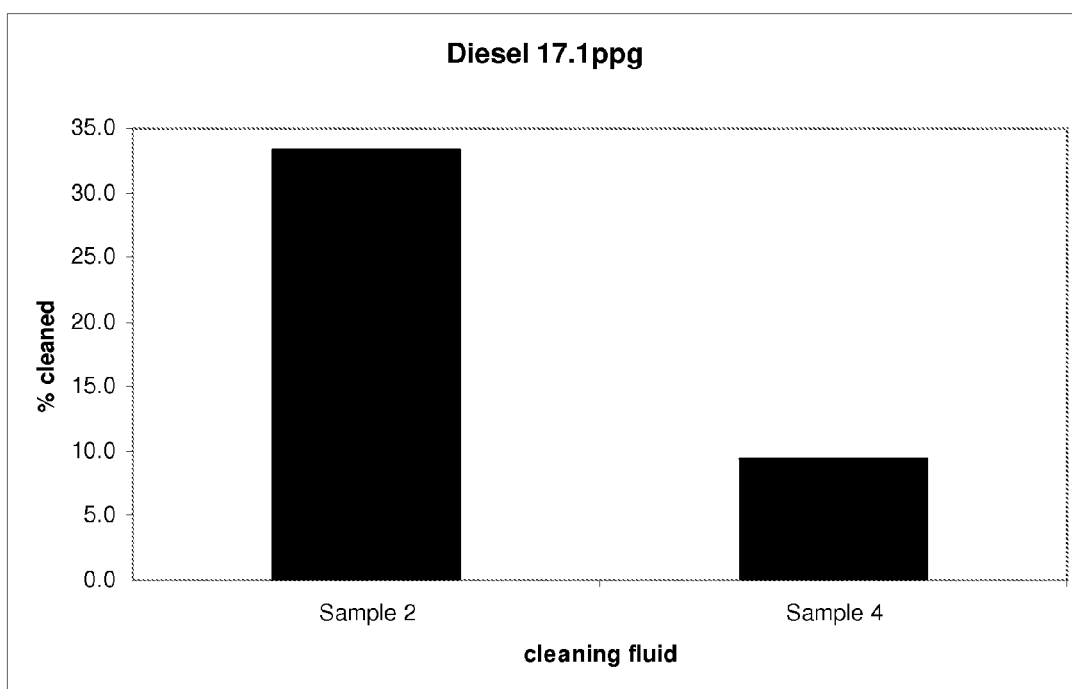
FIG. 3 is a plot of percentage oil cleaned as a function of cleaning fluid for the samples from Example 4.

The ability of OSFs of the type described herein, also referred to as cleaning fluid, to solubilize diesel field mud was investigated and compared to a conventional casing cleaner. The OSF used for in this example was Sample 2 from Example 1. The conventional casing cleaner was Sample 4 from Example 3. The diesel field mud had a high solids loading with a density of 17.1 ppg. FIG. 3 is a plot of percentage diesel solubilized as a function of the sample type for the cleaning test performed at 75° F. and the test speed of 300 rpm. The results demonstrated that Sample 2 was able to remove more than 30% of diesel field mud from the beaker while Sample 4 was able to remove about 10% of diesel field mud.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
    introducing a first wellbore servicing fluid comprising at least one oleaginous fluid into a wellbore, wherein the first wellbore servicing fluid forms oil-wet solids and/or oil-wet surfaces in the wellbore; and
    contacting the oil-wet solids and/or oil-wet surfaces in the wellbore with a second wellbore servicing fluid comprising a zwitterionic surfactant selected from the group consisting of alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, or combinations thereof, a co-surfactant, and an aqueous component to form a microemulsion.

2. The method of claim 1 wherein the co-surfactant comprises alkyl alcohols, alkyl acetate, alkyl pyrollidone, alkyl ketone, acryl amide, or combinations thereof.

3. The method of claim 2 wherein the alkyl alcohol comprises methanol, ethanol, propanol, butanol, or combinations thereof.

4. The method of claim 2 wherein the alkyl pyrollidone comprises n-octyl-2-pyrollidone, n-methylpyrollidone, or combinations thereof.

5. The method of claim 1 wherein the aqueous component comprises brine solutions comprising halide-containing salts, alkali metal salts, alkaline metal salts, formate-containing compounds, sodium bromide (NaBr), calcium chloride ($CaCl_2$), calcium bromide ($CaBr_2$), sodium chloride (NaCl), zinc bromide ($ZnBr_2$), ethyl formate, sodium formate, cesium formate, potassium formate, methyl formate, methyl chloroformate, triethyl orthoformate, trimethyl orthoformate, derivatives thereof, or combinations thereof.

6. The method of claim 1 wherein the brine solution comprises sodium bromide, calcium chloride, calcium bromide, sodium chloride, zinc bromide, or combinations thereof.

7. The method of claim 1 wherein the brine solution has a density of from about 8.5 ppg to about 15.1 ppg.

8. The method of claim 1 wherein the oleaginous fluid comprises olefin, internal olefin based oil, mineral oil, kerosene, diesel oil, fuel oil, synthetic oil, linear or branched paraffin, ester, acetal, mixtures of crude oil, derivatives thereof, or combinations thereof.

9. The method of claim 1 wherein the oil-wet solids and/or oil-wet surfaces comprise residuals on a casing, components of a filtercake, components of a formation face, components of a fracture face, components of a perforation, components on a screen, components on a gravel pack screen, or combinations thereof.

10. The method of claim 1 further comprising removing the microemulsion from the wellbore.

11. The method of claim 1 further comprising:
    providing a first composition comprising the zwitterionic surfactant and the co-surfactant;
    contacting the first composition with the aqueous component to form the second wellbore servicing fluid; and
    contacting the second wellbore servicing fluid with the oil-wet solids and/or oil-wet surfaces in the wellbore.

12. The method of claim 1 wherein a portion of oil is removed from the oil-wet solids and/or oil-wet surfaces and contained within the microemulsion.

13. The method of claim 1 wherein a portion of oil is removed from the oil-wet solids and/or oil-wet surfaces and contained within the microemulsion and further comprising removing the microemulsion from the wellbore.

14. The method of claim 1 wherein the alkyl betaine comprises laurylamidopropyl betaine, decyl betaine, dodecyl betaine, or combinations thereof.

15. The method of claim 1 wherein the alkyl amine oxide comprises decylamine oxide, dodecylamine oxide, tetradecylamine oxide, or combinations thereof.

16. The method of claim 1 wherein the phospholipid comprises lecithin, phosphatidyl choline, derivatives thereof, or combinations thereof.

17. The method of claim 1 wherein the zwitterionic surfactant and the co-surfactant are present in the second wellbore servicing fluid in a mole ratio of from about 1:10 to about 10:1.

18. The method of claim 1 wherein the co-surfactant is hydrophobic and does not self-aggregate.

19. The method of claim 1 wherein the amount of oleaginous fluid contacted by the second wellbore servicing fluid is from about 0.01 ml to about 1.0 ml of oleaginous fluid per 1 ml of a 30 wt. % solution of the second wellbore servicing fluid.

20. The method of claim 1 wherein the microemulsion forms in less than about 10 minutes.

21. The method of claim 1 wherein the second wellbore servicing fluid when exposed to a temperature of from about 65° F. to about 350° F. for a period of from about 1 hour to about 240 hours retains its ability to form a microemulsion when contacted with a oleaginous fluid.

22. The method of claim 1 wherein the zwitterionic surfactant comprises an alkyl betaine, the co-surfactant comprises an alkyl alcohol, and the water is a brine.

23. The method of claim 1 wherein the zwitterionic surfactant comprises an alkyl amine oxide, the co-surfactant comprises an alkyl alcohol, and the water is a brine.

* * * * *